United States Patent Office 3,309,096
Patented Mar. 14, 1967

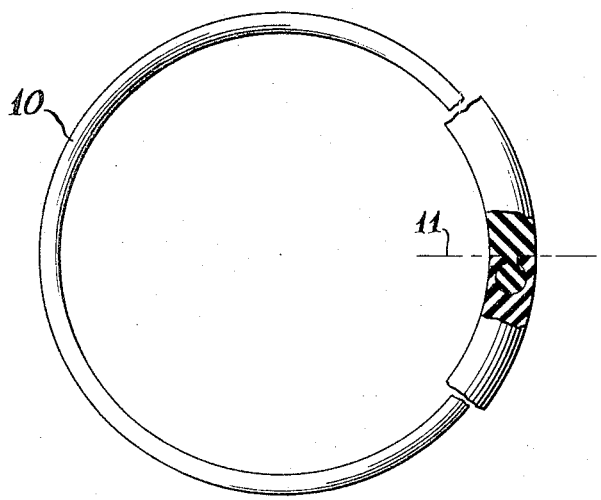
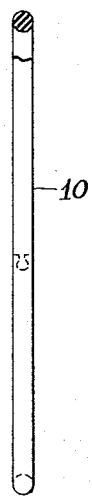
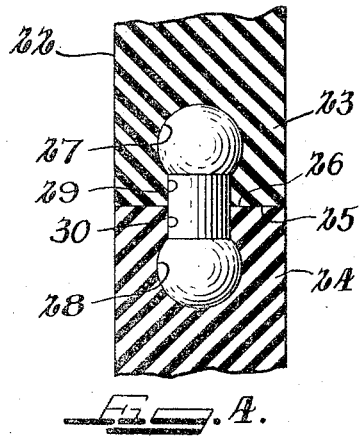
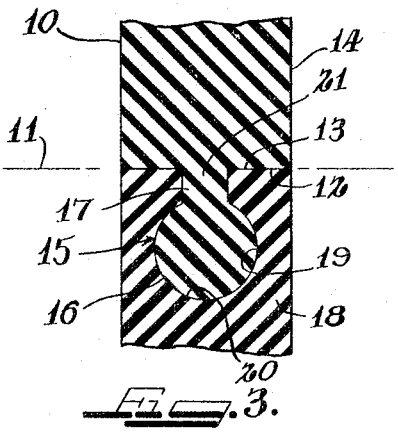
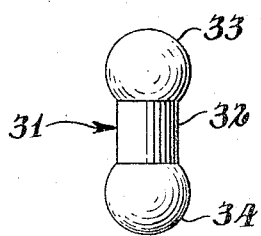
INVENTOR.
EGONS INKA

3,309,096
SPLIT CIRCULAR SEALING ELEMENT
Egons Inka, 317 N. Menard, Chicago, Ill. 60644
Filed Feb. 26, 1964, Ser. No. 347,490
1 Claim. (Cl. 277—222)

This invention relates to packing and sealing rings, and particularly to a form of sealing ring commonly known as an O ring.

The O ring is an endless ring made of a flexible, resilient, deformable material and having a circular radial cross-section. Such rings may be used either as static or dynamic seals. As dynamic seals they are frequently found in end-face rotary mechanical seals as the member which is designed either to move or to deform to maintain a seal between a rigid washer forming part of the end-face seal and the element to which the washer is nonrotatably but axially movably connected. Thus the O ring is often used in a position where it encircles a shaft or some other portion of cylindrically shaped equipment handling fluids.

The material of which the O ring is formed may deteriorate with use or with contact with certain fluids. It is also possible that although the O ring itself may not deteriorate, the washer with which it is associated may wear and may require replacement. In such situations it becomes necessary to disassemble the equipment to remove the O ring from its encircling relation with respect to the shaft or the like and to replace it with another O ring. The labor involved in disassembling the equipment to remove and replace an O ring usually costs more than the O ring itself.

An object of this invention is the provision of an O ring which is not endless and hence can be removed from and replaced about a shaft or the like without disassembling bearings supporting the end of the shaft adjacent the O ring.

More specifically, this invention has within its purview the provision of an O ring or the like which is split, with means for readily bridging the split portion of the ring to give in effect an endless ring.

As a further specific object, this invention provides an O ring which is split, the ends being formed with sockets into which a connecting pin is adapted to be inserted to form a connection between said ends.

These and other objects of this invention will become apparent from the following detailed description when taken together with the accompanying drawings in which:

FIG. 1 is a plan view of an O ring which is split and whose ends are connected in accordance with this invention, the split portion of the O ring being sectioned to show the connection between the ends;

FIG. 2 is an end elevational view of the ring of FIG. 1;

FIG. 3 is a greatly enlarged fragment of the ring of FIG. 1, in section, showing the split ends and the manner in which they are connected together;

FIG. 4 is a greatly enlarged fragment of a modification of the ring of FIG. 1 showing another manner in which the split ends of the ring may be connected together; and FIG. 5 shows the pin used to connect the ends in the FIG. 4 form of the invention.

In general, this invention comprises forming a ring of sealing material either as a circular object with an interruption to provide adjacent ends, or as a length of the material which is subsequently to be bent into a circle with adjacent ends. In either case, at least one of the ends is formed with a socket which widens as it becomes deeper to result in the formation of a restricted opening thereinto. The other end is provided with a pin-like extension, either as an integral part thereof or as an addition thereto, said extension having a ball or other enlargement at the end thereof adapted to be received in the socket in the first-mentioned end. The spacing between the enlargement on the pin-like end and the transverse surface of the end is somewhat smaller than the corresponding dimension of the socket so that when the pin is assembled in the socket the ends of the ring or section will be drawn together and held in contact with one another with a fluid-tight seal.

Referring now to FIG. 1 there is shown a ring-shaped packing 10, which is not endless, however, but is split along a radial line 11. Said packing 10 may be formed of any of the materials commonly used to effect a seal, but for purposes of illustration it will be described as being made of an elastomeric material, such as rubber, either synthetic or natural, or a combination of the two. Such rings, when formed as an endless ring, are generally designated by the term "O-ring" and are adapted for use either as stationary seals, such as gaskets or the like, or as dynamic seals around reciprocating pistons and rods, or as axially movable portions of shaft seals.

It is imperative, of course, that the ring-shaped packing 10 form a continuous unbroken fluid-tight seal across the radial dimension thereof and hence it is important that the ends of the packing be brought together with a fluid-tight fit along the radial line 11. It is also important for assembly reasons that the ends be held together in the manner of a continuous ring while said ring is moved along a shaft or rod to the position it will occupy thereon, or while other apparatus or elements are assembled around said packing ring.

The means for bringing and holding the ends of the ring-shaped packing 10 together is shown on an enlarged scale in FIG. 3. The end surface are shown at 12 and 13, and are generally radially disposed with respect to ring-shaped packing 10. End 14 on which surface 12 is found, has formed integrally therewith a pin 15. Said pin 15 is comprised of a sphere 16 and a reduced cylindrical neck portion 17 by which sphere 16 is connected to end 14. Said pin 15 is preferably centrally located with respect to surface 12, so that the neck portion 17 is substantially concentric with the cross-sectional configuration of end 12.

End 18 of ring 10 on which radially disposed end surface 13 is found, is formed with a cavity 19 having a configuration substantially identical with that of pin 15 in that it is formed with a spherical chamber 20 which is connected to the exterior by a cyindrical opening 21 of a lesser diameter than the diameter of the spherical portion 20.

It is important, however, that the two ends 14 and 18 be resiliently urged toward one another so that their respective surfaces 12 and 13 be in contact with one another to provide a fluid-tight seal therebetween. Such resilient holding effect is produced by making the cylindrical portion 21 of the cavity 19 slightly longer than the reduced cylindrical neck 17 on pin 15. This places the cylindrical neck 17 in tension, and the tension, in turn, through the spherical portion 16 is converted into a compressive force upon that portion of the end 18 which is located immediately adjacent neck 17.

It is contemplated that the diameter of the cylindrical portion 21 will be such as to allow this reduced portion to expand around the spherical portion 16 as the latter is inserted therethrough into spherical chamber 20. It is contemplated also that since portion 16 is made of resilient deformable material, it will also be deformed to some extent to permit it to pass through the reduced cylindrical portion 21.

In the form shown in FIGS. 1, 2 and 3, the radial cross-section of ring 10 is circular and hence the pin and socket connection formed by pin 15 and cavity 19 is symmetrically disposed with respect to the outer surfaces of said ring 10. Thus, should said ring be confined in a groove or the like, as is customary when the ring is used as a piston ring, there will be no appreciable change in the thickness of the ring at the joint. Minor deviations from the desired thickness can be readily overcome, however, by the natural deformability and flowability of the elastomeric material of which the ring is made.

It may be appreciated that some of the materials normally used for the formation of O rings may be relatively weak when reduced in thickness to the diameter of the cylindrical portion 17 of the pin 15. The strength of the pin may therefore be increased by forming the pin from a harder material. Such harder pin may be bonded to one of the ends during the formation of the ring itself, or it may be formed separately and inserted into both ends in the manner shown in FIGS. 4 and 5.

In the FIG. 4 form, the ring-shaped packing is designated as 22 and may similarly be made of a resilient deformable material such as rubber, either synthetic or natural, or a combination of the two. Said packing 22 is formed with ends 23 and 24, each of which terminates in a radially disposed flat surface 25 and 26, respectively. Each end is provided with a cavity 27, 28 of spherical form to which access is had from the surfaces 25 and 26 through cylindrical openings 29 and 30, respectively. Said cylindrical openings 29 and 30 are of reduced diameter relative to the diameters of the spherical cavities 27 and 28.

A connection is established between ends 23 and 24 by a pin 31, shown more clearly in FIG. 5. Said pin 31 has a cylindrical central section 32 and spherical ends 33, 34. The diameter of cylindrical central section 32 is substantially that of the openings 29 and 30, and the diameter of the spherical ends 33 and 34 is substantially that of the cavities 27 and 28. Said pin 31 may be comprised of a harder material, such as a fluorinated hydrocarbon, a phenolic resin, or even a metal, such as bronze, stainless steel, or the like. Ideally, however, said pin, although it is relatively short in proportion to its diameter and therefore is relatively stiff, nevertheless, it should have some flexibility so that when the ring is assembled around a cylindrical surface, the abutting ends will conform thereto rather than form a relatively straight cylindrical section.

Pin 31 is inserted into cavities 27 and 28 in the manner shown in FIG. 4. As in the FIG. 3 form, the length of the cylindrical section 32 of pin 31 is slightly less than the combined axial length of the cylindrical openings 29 and 30, so that in the assembled condition a compressive force is created by spherical ends 33, 34 upon the material of the ends 23 and 24 therebetween to cause surfaces 25 and 26 to be held together in fluid-tight relation.

If desired, pin 31 may be molded into one of the ends during the formation of the ring 22 to provide in effect the form shown in FIG. 3.

It is understood that the method of joining the ends of a packing shown in FIGS. 3, 4 and 5, may be applied to rings having cross-sections other than the circular radial cross-section shown in FIG. 1, and that therefore the scope of this invention is not to be limited to the illustrative embodiment thereof shown and described herein, but is to be determined by the appended claim.

I claim:

A circular sealing element for effecting a seal between substantially concentric cylindrical surfaces comprising a length of resilient deformable sealing material of circular cross-section adapted to be inserted between said surfaces with its ends in abutting relation to one another, and means for connecting and holding said ends in said abutting relation, said means comprising a pin having a substantially cylindrical central section and spherical ends, and the ends of said length of material each having a socket adapted to receive a spherical end of said pin and a cylindrical opening connecting the socket to the exterior, the diameter of the cylindrical opening being smaller than the diameter of the socket, and the combined lengths of the cylindrical openings in said ends being greater than the length of the cylindrical central section of the pin.

References Cited by the Examiner

UNITED STATES PATENTS

| | | | |
|---|---|---|---|
| 342,850 | 6/1886 | Smith | 24—123 |
| 2,768,036 | 10/1956 | Greenough | 277—222 |

LAVERNE D. GEIGER, *Primary Examiner.*

D. MASSENBERG, *Assistant Examiner.*